(12) United States Patent
Lovell et al.

(10) Patent No.: US 6,603,493 B1
(45) Date of Patent: Aug. 5, 2003

(54) METHOD FOR ARRANGING DISPLAY ELEMENTS

(75) Inventors: Douglas C. Lovell, Fishkill, NY (US); Richard D. Thompson, Trumbull, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/290,165

(22) Filed: Apr. 13, 1999

(51) Int. Cl.$^7$ .................................................. G06F 3/14

(52) U.S. Cl. ........................ 345/800; 345/815; 345/660

(58) Field of Search .................................. 345/700, 764, 345/765, 781, 798–801, 810, 815, 835, 866, 660, 667–671; 707/517–521; 715/517–521

(56) References Cited

U.S. PATENT DOCUMENTS

| | | | | |
|---|---|---|---|---|
| 5,001,697 A | * | 3/1991 | Torres | 345/467 |
| 5,060,170 A | * | 10/1991 | Bourgeois et al. | 345/788 |
| 5,642,490 A | * | 6/1997 | Morgan et al. | 345/762 |
| 5,880,725 A | * | 3/1999 | Southgate | 345/784 |
| 6,414,698 B1 | * | 7/2002 | Lovell et al. | 345/800 |
| 6,415,306 B2 | * | 7/2002 | Seaman | 707/517 |

* cited by examiner

Primary Examiner—Crescelle N. dela Torre

(57) ABSTRACT

A computer display layout manager that reduces the need to hand-craft the layout of application screens is able to rearrange elements according to the shape of the available area. The automated process helps interface designers create user interfaces which work well on multiple devices and in resizeable windows. The layout manager uses height for width and width for height trade-offs to resize elements. The elements of each row or column are packed and resized according to predetermined preferred sizing criteria.

7 Claims, 15 Drawing Sheets

FIG.15

TEST 2

YOU
- GIVEN NAME
- M.I.
- SURNAME
- ZIP CODE
- CITY
- STATE
- STREET ADDRESS

YOUR EMPLOYER
- NAME
- ZIP CODE
- CITY
- STATE
- STREET ADDRESS

FIG. 16

METHOD FOR ARRANGING DISPLAY ELEMENTS

CROSS-REFERENCE TO RELATED APPLICATION

This application is related to a concurrently filed application Ser. No. 09/290,164, now U.S. Pat. No. 6,414,698, entitled "Method for Enabling Adaptive Sizing of Display Elements" filed by D. Lovell and R. Thompson and assigned to a common assignee, the subject matter of which is incorporated herein by reference.

BACKGROUND OF THE INVENTION

1. Field of the Invention

The present invention generally relates to the design of computer display layout managers and, more particularly, to a method for arranging display elements to improve screen appearance, especially when displaying the components on a screen of unknown size.

2. Background Description

Layout managers are computing tools for arranging "elements" in a computer display. Elements are pictures, buttons, blocks of text, or other graphics which may be passive or active. Passive elements are for viewing only. Active elements may cause a change in appearance or behavior when stimulated by the action of a person viewing the display. These are the fundamental, abstract components of every display-based human-computer interface.

Layout managers function by finding the size of the elements of the display and positioning them according to a predetermined method. A state of the art layout manager may query a state of the art element for minimum, maximum and preferred size. These element properties are typically stored in a look-up table or coded into the description of the element. Some layout managers align their elements in a row or a column. Others assign elements to a predetermined area, such as the top, bottom, left, right, or center.

When a layout manager arranges elements, it often creates areas not occupied by any element. This is especially true if the elements are not uniform in size. Layout managers will typically enlarge elements in one dimension to fill the unused areas. A layout manager which places a narrow element above a wide element might make the narrow element wider to keep the elements uniform in width. That action may leave the narrow element with more height than it requires.

To illustrate the problem, consider the following. We have a title element whose content is "AutoLoan Exchange." The element preferably stacks the words "AutoLoan" above the word "Exchange." It is eight characters wide and two lines high. A layout manager assigns a wider, thirty-character width. Now, the entire title fits on one line, but the element height remains at two lines.

Poor packing of display elements gives a poor aesthetic impression, wastes space available on the screen, and impairs understanding of the interface. The appearance and layout of a user interface must be aesthetically pleasing to excite interest while functioning to clearly present what the user expects and what is expected of the user. Accordingly, authors invest a large amount of time hand crafting the layout of each screen in an application, at high cost per screen.

In many applications, it is not possible to craft the user interface to the available screen size because that size is not known in advance. Windowing systems confine applications to frames which the user may resize. Personal Information Devices (PIDs) have various display sizes and resolutions. User interfaces in windowing systems and on PIDs must adapt to changes in the width and height available for display.

The layout managers used in Web browsers have these problems, and do so poorly that many Web page designers often resort to the use of tables to control the layout behavior. This is costly in terms of time and effort involved in producing Web content.

SUMMARY OF THE INVENTION

It is therefore an object of the invention to provide a layout manager that reduces the need to hand-craft the layout of application screens.

The present invention is able to rearrange elements according to the shape of the available area. It helps interface designers create user interfaces which work well on multiple devices and in resizeable windows. The invention uses height-for-width and width-for-height trade-offs to resize elements.

It is another object of the invention to provide a layout manager that automatically adapts to changes in the size of the display by customizing the display elements based on available height and width of the display area. Thus, the present invention reduces the need to hand-craft the layout of the application screens.

The invention is also useful where a layout manager must adapt to the display of many different devices. Personal Information Devices (PIDs), for example, have displays which vary greatly in size and in aspect ratio. A designer creating an application for PIDs has no opportunity to hand-craft the screens for each display. Only an automatic method, as made possible by the present invention, will solve the problems which occur as the size of the target display area changes.

It is an object of the invention to function with elements in the prior art. If the layout manager must interact with applications that have not been enhanced to interact with the improved layout manager, it uses an algorithm already existing in the state of the art to arrange the display.

BRIEF DESCRIPTION OF THE DRAWINGS

The foregoing and other objects, aspects and advantages will be better understood from the following detailed description of a preferred embodiment of the invention with reference to the drawings, in which:

FIG. 15 is a screen print showing an example of a poorly arranged window display; and FIG. 16 is a screen print showing an example of a visually pleasing window display created by the method of the present invention.

DETAILED DESCRIPTION OF A PREFERRED EMBODIMENT OF THE INVENTION

The layout manager of the present invention is implemented as a software application that interacts with other applications that require elements to be displayed on a display device. It is a sub-module of a display manager as may be found in the state of the art. The display manager and improved layout manager are implemented using object oriented techniques such that each display element is implemented as an instantiation of the element class, with size queries implemented as functions, or object methods. When an active application requires an update of the display, the layout manager interacts with the active application to retrieve display information in the form of display elements.

The first step of the general method is an attempt to pack elements into a row given available width. Some elements may be taller than others. The height of the shorter elements is extended if they will become narrower when they become taller. In this way, as many components as possible will be placed on a row.

Figure 1:
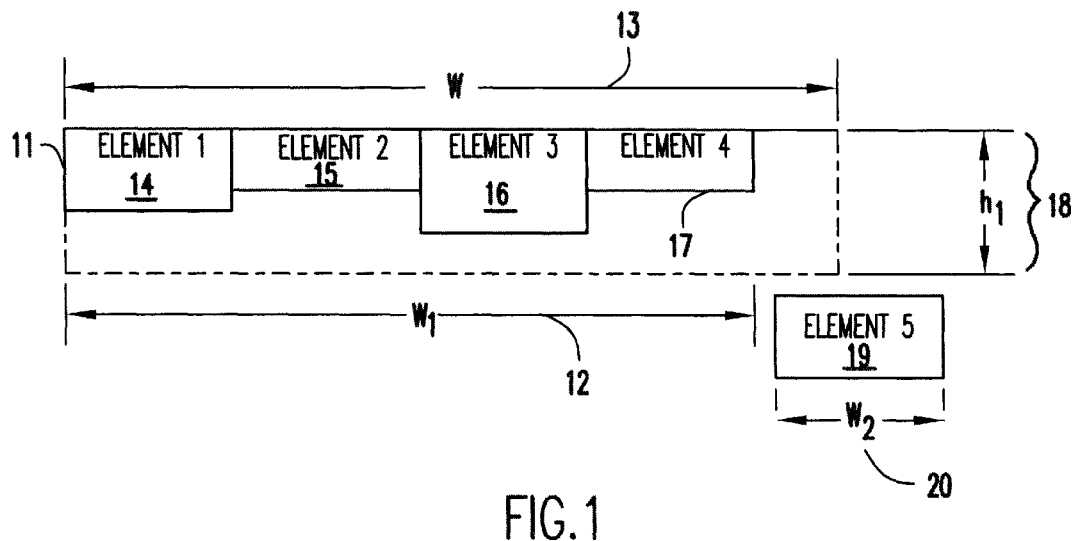
FIG. 1 is an illustration showing an example of a row filled with four display elements.

Referring now to the drawings, and more particularly to FIG. 1, there is shown a row of display elements 11 of actual width $w_1$ 12 and actual height $h_1$ 18 in a display area of available width W 13. Prior to compressing the row, only four elements 14, 15, 16 and 17 will fit in the row. A fifth element 19 with width $w_2$ 20 will not fit on the row because the sum of widths $w_1$ 12 and $w_2$ 20 exceeds available width W 13.

Figure 2:
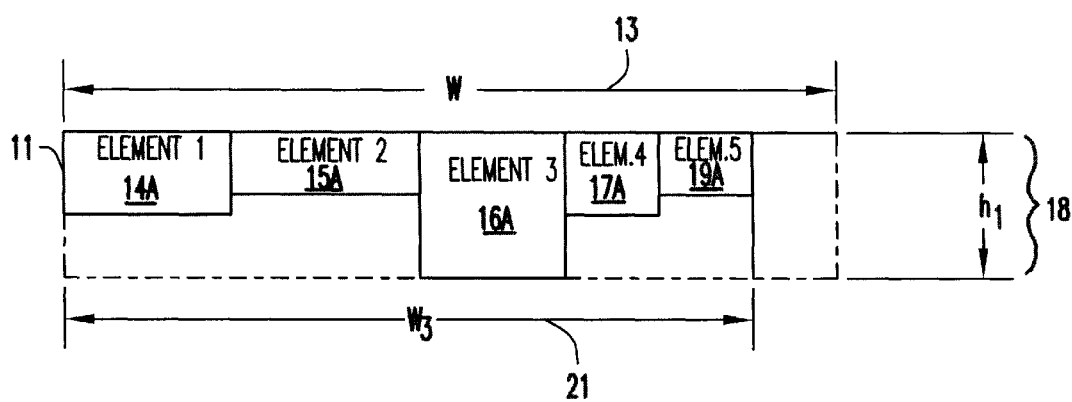
FIG. 2 is an illustration similar to FIG. 1 showing the row after compression and the addition of another fifth element according to the method of the invention.

FIG. 2 illustrates the packed and compressed row of FIG. 1. The original four elements 14a, 15a, 16a and 17a have been resized according to the method of the invention so that the row can now accommodate the additional element 19a. The compression of elements 14a, 15a, 16a and 17a typically results in one or more of the elements increasing in height and decreasing in width. The new total width $W_3$ 21 is still less that the available width W 13, but no more elements will fit on the row, even with compression.

Figure 3:
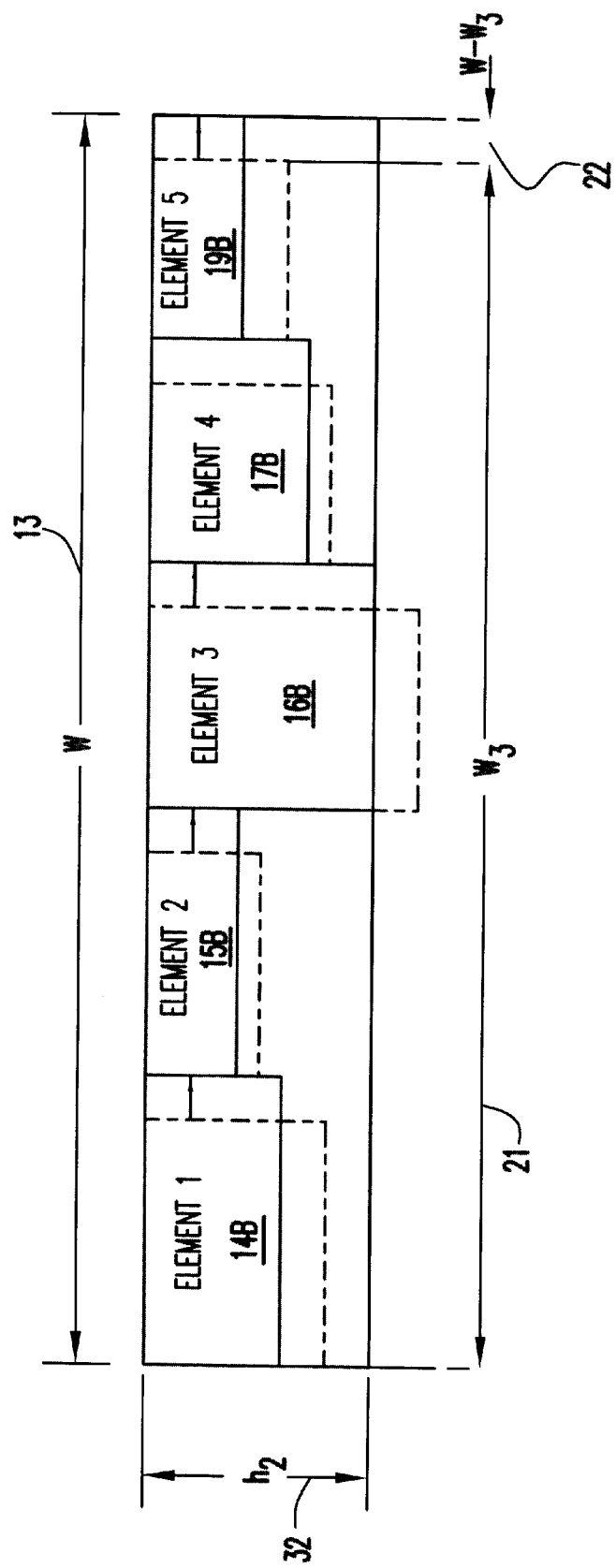
FIG. 3 shows an example of how extra width is distributed to the row of FIG. 2, according to the method of the invention.

FIG. 3 illustrates the completed row of FIG. 2. The excess width $W-w_3$ 22 has been distributed to each of the elements 14b, 15b, 16b, 17b and 19b so that their total width now equals the available width W 13. The elements may decrease in height when they increase in width, resulting in a new height for the row, $h_2$ 32, which is less than the original height for the row, $h_1$ 18, as shown in FIGS. 1 and 2.

Controls may be provided to cause the layout manager to distribute extra width in different proportions to each of the elements.

Figure 4:
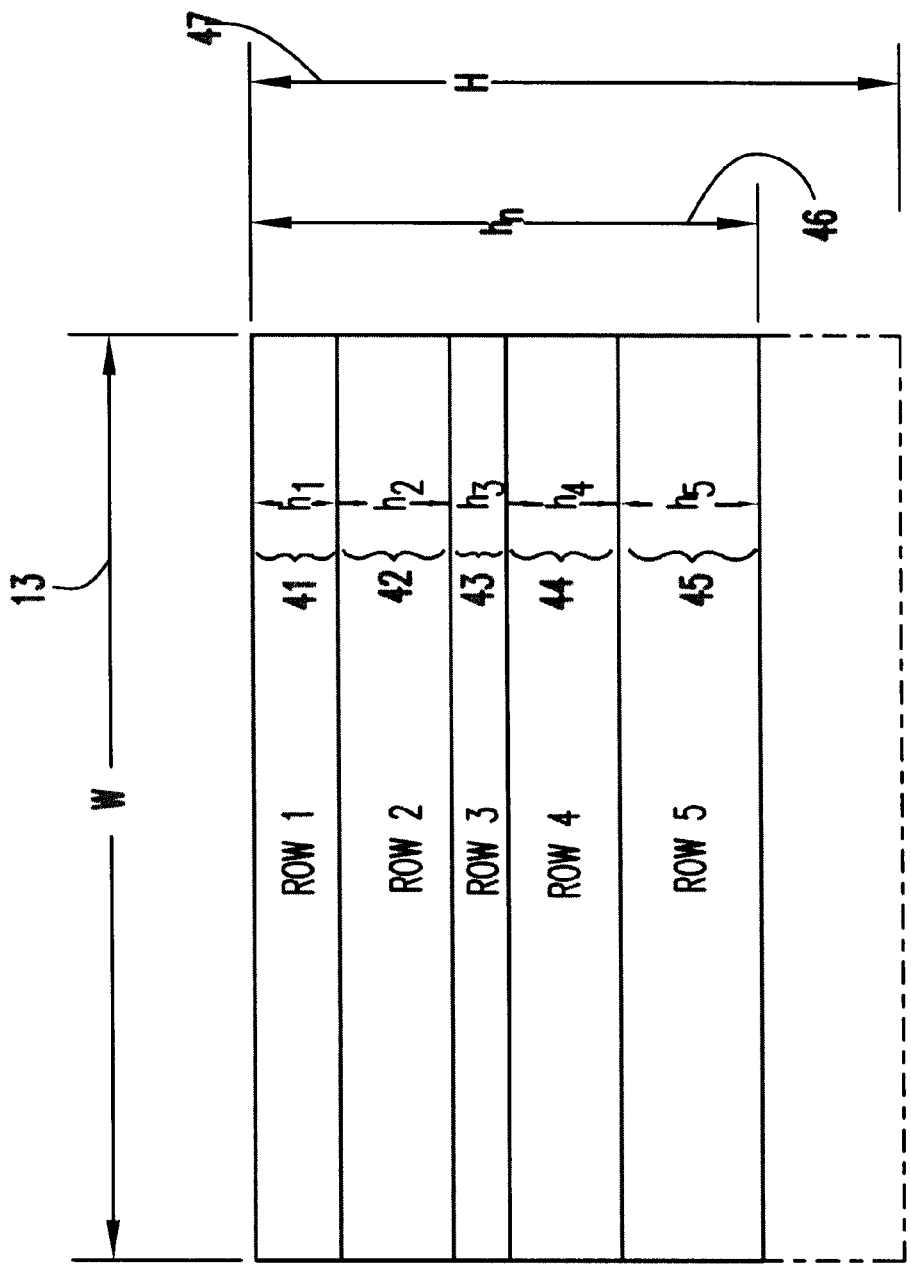
FIG. 4 shows an example of five compressed and then stacked rows according to the method of the invention.

The layout manager now stacks each optimized row, as shown in FIG. 4. The width of each row has now been increased to the full available width W 13, and the row height adjusted accordingly. The total height of the rows is the actual height $h_n$ 46, or the sum of the row heights $h_1$ through $h_5$ 41, 42, 43, 44 and 45, which may be less than the available height H47.

Figure 5:
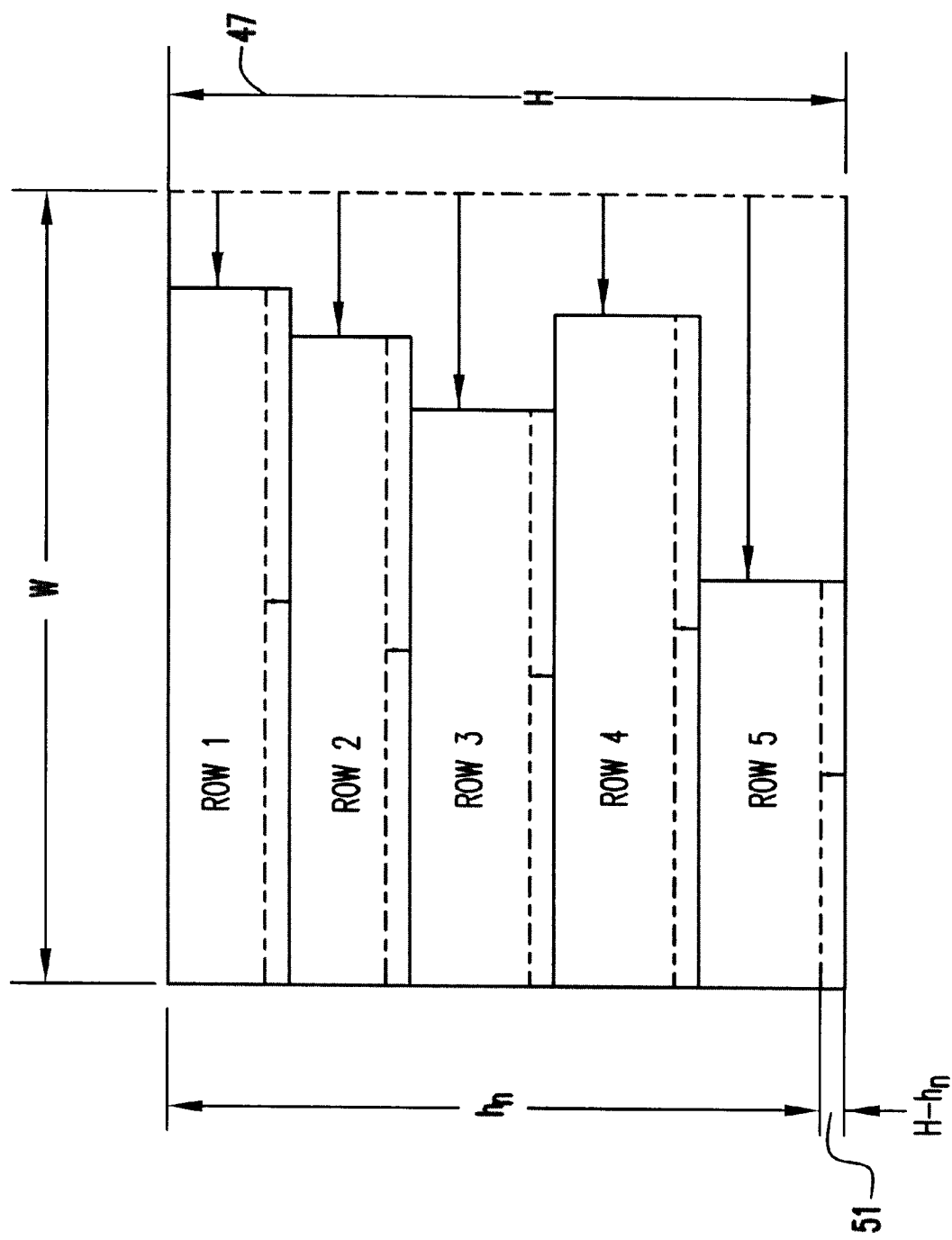
FIG. 5 shows an example of how extra height is distributed to each row of FIG. 4, according to the method of the invention.

FIG. 5 shows the excess height $H - h_n$ 51 of FIG. 4 distributed to rows 41, 42, 43, 44 and 45 such that the sum of the heights of each row now equals the height available H 47. The rows may become narrower as height for width trade-offs are used to find new, narrower widths for each element given the increased height. The method of distribution may optionally only move the rows so that the excess height is above and below them in some proportion, as illustrated by FIGS. 6 and 7.

Figure 6:
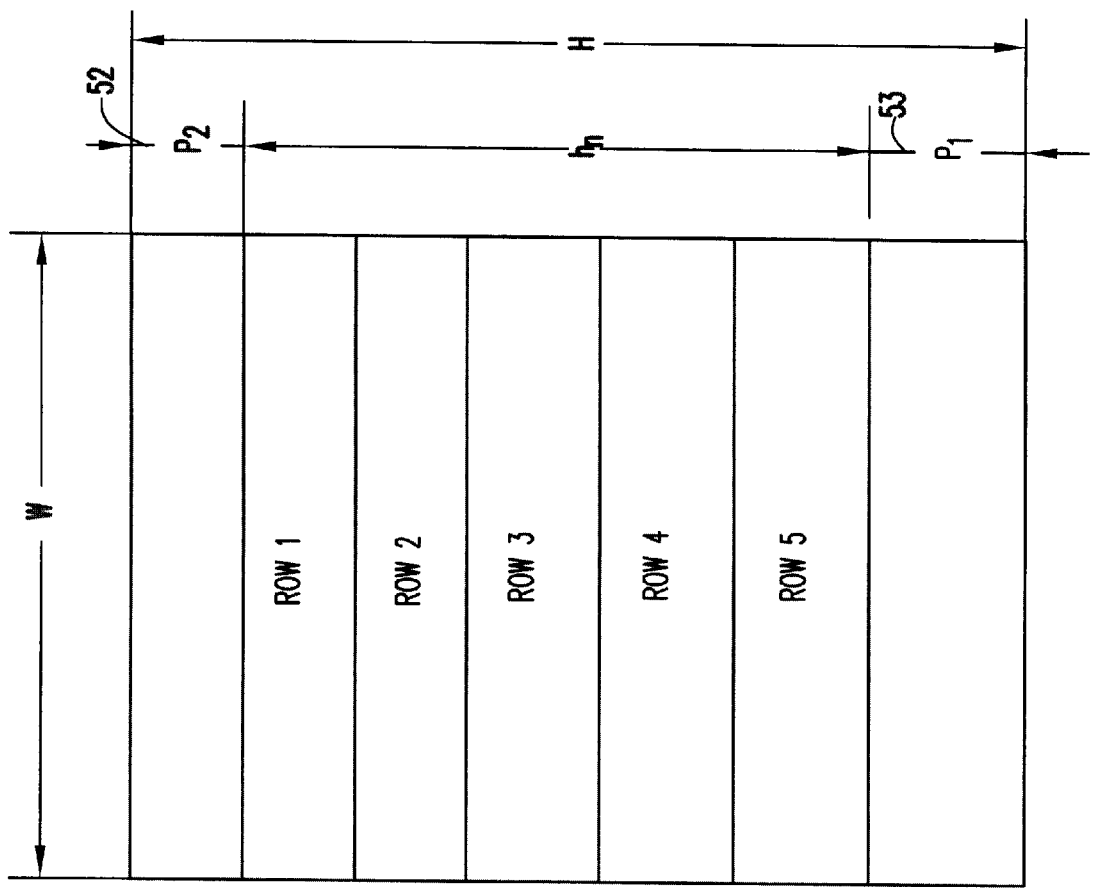
FIG. 6 shows a first alternate method of distributing extra height to the rows of FIG. 4.

FIG. 6 illustrates an alternate method of distributing extra height. A proportion of the extra space $p_2$ 52 may be distributed above at and a proportion of the extra space $p_1$ 53 may be distributed below the rows, giving less than all, or none of the extra height to each row.

Figure 7:
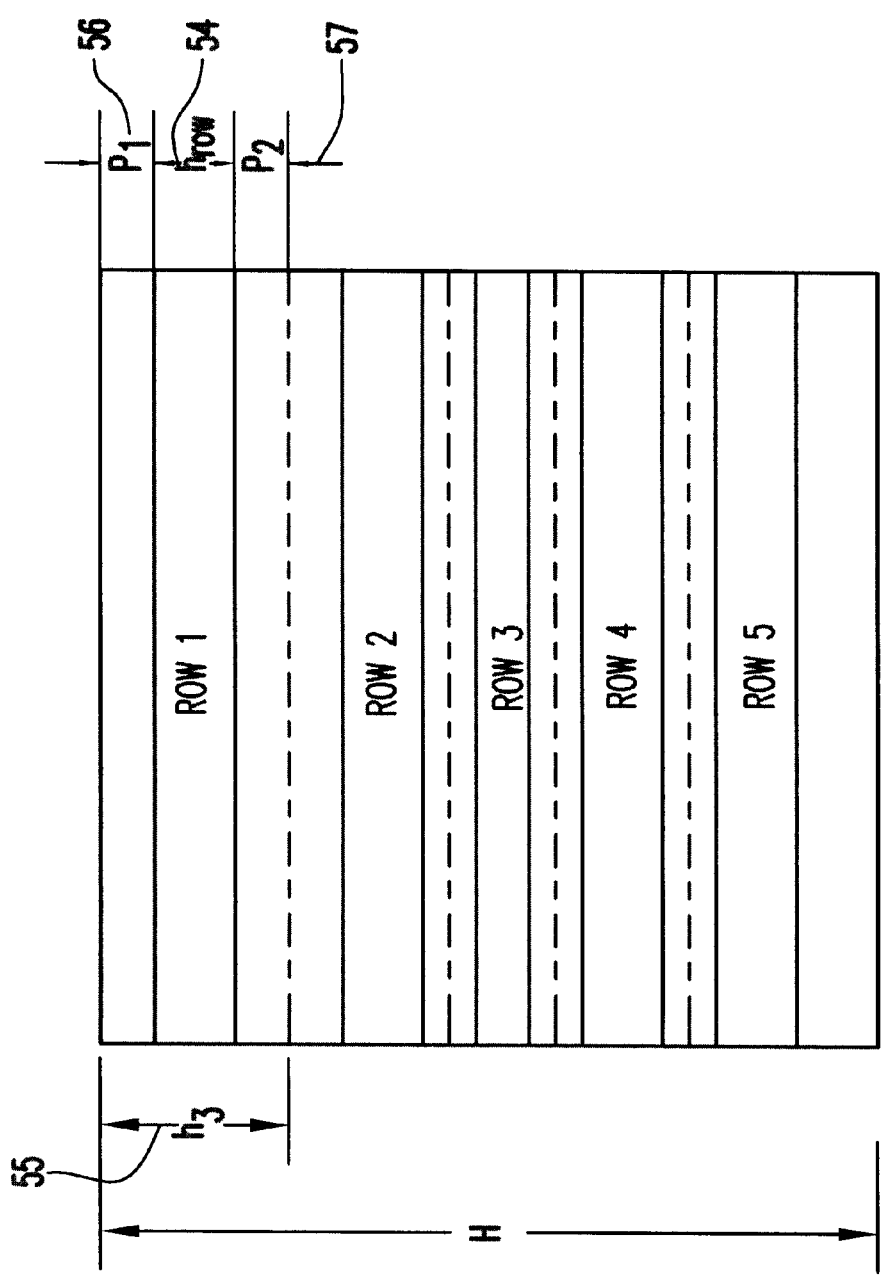
FIG. 7 shows a second alternate method of distributing extra height to the rows of FIG. 4.

FIG. 7 illustrates another alternate method of distributing extra height. A proportion of the extra space may be distributed above and below each row, giving less than all, or none of the extra height to each row. For instance, the height of Row 1 $h_{row}$ 54 is increased to $h_3$ 55 by adding a proportional height above the row $p_1$ 56 and a proportional height below the row $p_2$ 57.

Figure 8:
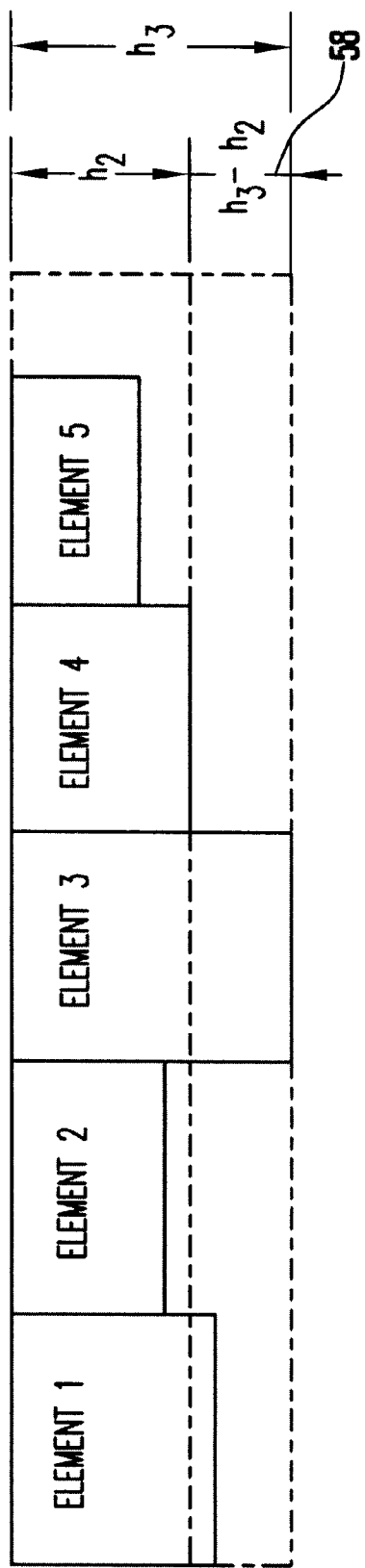
FIG. 8 shows an example of how extra height is distributed to the row of FIG. 2, according to the method of the invention.

FIG. 8 illustrates distribution of extra height $h_3-h_2$ 58 to one row. The width of each element may decrease when the layout manager increases its height. A layout manager could elect to repack the row given the new height, restack the resulting taller rows, and iterate until no elements changed row assignments. In the extreme case this could result in all of the rows being reduced to one row of taller, narrower elements. We have not elected to do this.

Figure 9:
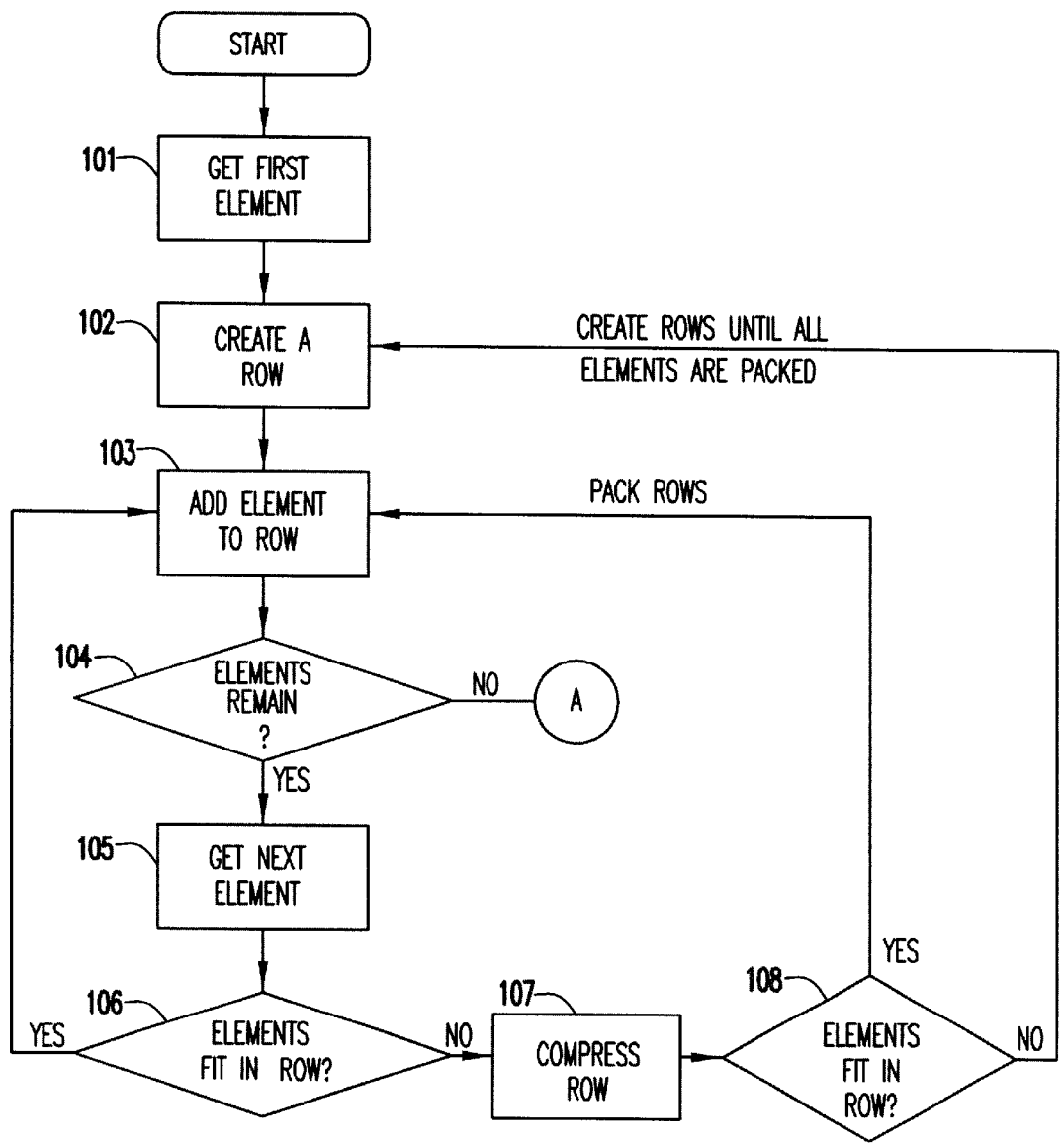
FIGS. 9 and 10 combined are a flow diagram illustrating the logic of the method for arranging display elements according to the invention.
Figure 10:
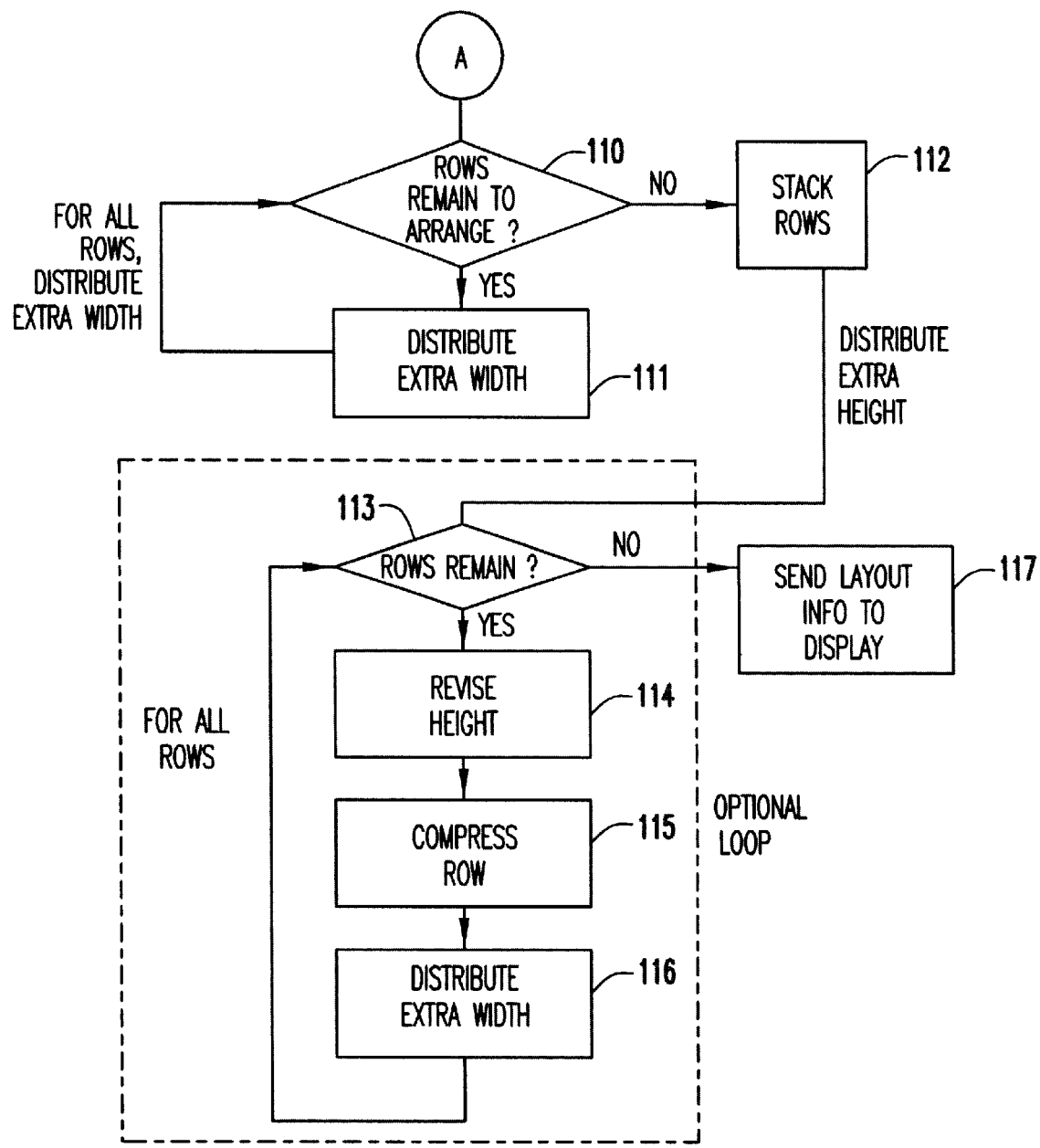

The process is illustrated in FIGS. 9 and 10, where there is shown a flow diagram illustrating the method for arranging display elements according to the invention. The process begins in function block 101 by retrieving the first element and then enters the first processing loop which creates and packs rows until elements have been placed in a row. This loop begins with the creation of a new row in function block 102. The row is then packed until no more elements will fit, as follows. At block 103 we add at least one element to the row. A test is made in decision block 104 to determine whether any elements remain that have not been placed in a row. If so, we get the next element in function block 105. A test is made in decision block 106 to determine whether the current element fits in the row. If so, we continue to add elements to the row by looping back to block 103. If the element will not fit on the row, as determined in decision block 106, the row is compressed in function block 107 by calling the Compress Row routine shown in FIG. 11.

Figure 11:
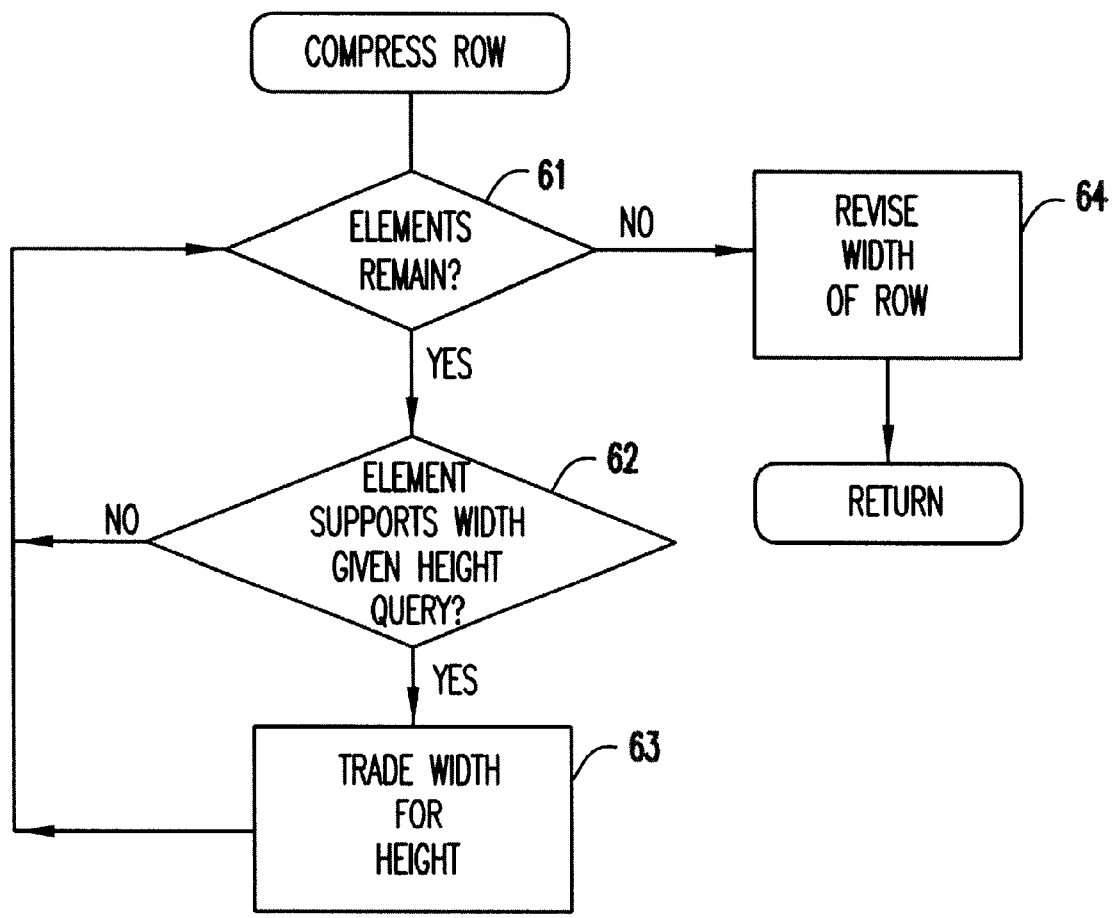
FIG. 11 is a flow diagram illustrating the Compress Row routine called by the method shown in FIGS. 9 and 10.

Referring now to FIG. 11, the Compress Row routine called in function block 107 of FIG. 9 is described. The Compress Row routine adjusts the width of each element already in the row as follows. A test is performed in decision block 61 to determine if there are additional elements in the row remaining to arrange. If so, then another test is performed in decision block 62 to determine if the next element supports a width given height query. If not, then the element is added to the row according to a method of the prior art and the process loops back to decision block 61 to continue processing elements in the row. If the element does support the width given height query, then the routine trades width for height in function block 63. In this process, a query is sent to the element asking for a preferred width w given a height h. This query is not used in the prior art and its use results in a greater improvement in row compression. The prior art uses queries for minimum, maximum and preferred size only. The unique advantage to the present invention is that here the element is designed to compute its preferred width given a height and returns the preferred width. An element designed to return the necessary information on query is disclosed in the concurrently filed, copending application Ser. No. 09/290,164, now U.S. Pat. No. 6,414,698. The preferred value for each element is stored, and processing continues until all elements in the row have been processed. When all elements in the row have been processed, the width of the row is revised in function block 64 by totaling all the preferred widths stored for the elements of the row, and a return is made to function block 107 which called the routine.

Once again referring to FIG. 9, after row compression is performed in function block 107, as described above, control is passed to decision block 108 to determine if the current element will fit in the compressed row. If the element still will not fit in the newly compressed row, a new row is created in function block 102 and the process continues packing elements in this new row, as described above. If the element will fit, control is passed to function block 103 to add the current element to the row and packing continues, as above with decision block 104. Thus, the method creates new rows and packs each row until all required elements have been placed in a row.

If no more new elements remain, as determined in decision block 104, the next processing loop is entered as illustrated in FIG. 10. A test is performed in decision block 110 to determine whether additional rows remain to arrange. If so, the extra width is distributed in function block 111 by calling the Distribute Extra Width routine shown in FIG. 12, as described below.

Figure 12:
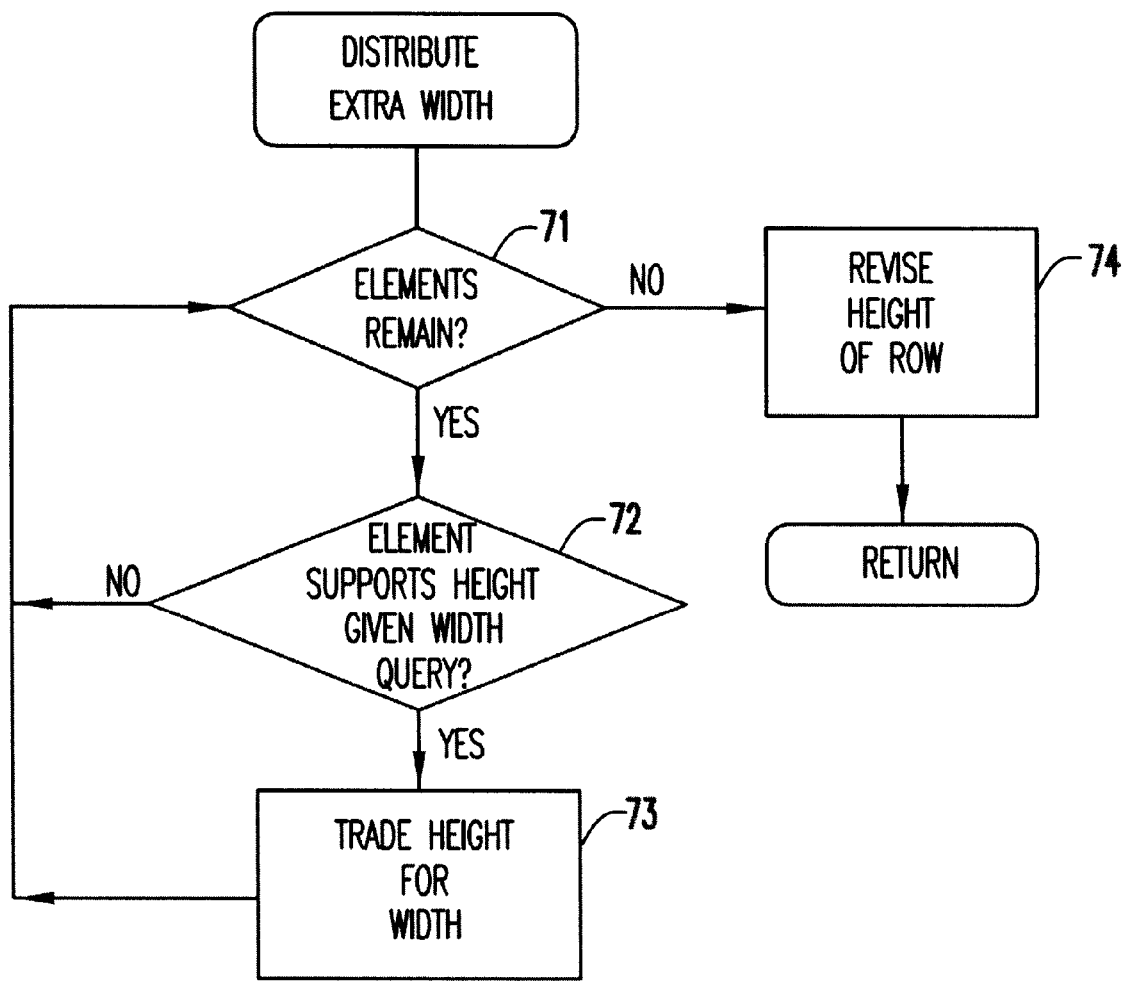
FIG. 12 is a flow diagram illustrating the Distribute Extra Width routine called by the method of FIG. 10.

Referring to FIG. 12, extra width is distributed as follows. A test is performed in decision block 71 to determine if elements remain in the row. If so, then another test is performed in decision block 72 to determine if the next element supports a query. If not, then the element is added to the row according to a method of the prior art and the process loops back to decision block 71 to continue processing elements in the row. If the element does support the height given width query then we trade height for width in function block 73. A query is sent to the element asking for a preferred height h given a width w. This query is not used in the prior art and its use results in a greater improvement in the resulting in appearance of the elements displayed. The element, so designed to compute its preferred height given width, returns the preferred height, in function block 73. The preferred height of the element is compared with a currently stored height of a previously processed element and, if the preferred height has a value exceeding that of the currently stored height, then preferred height of the element is stored; otherwise it is discarded. This continues until all elements in the row have been processed, at which time the currently stored height is the largest preferred height of all the elements in the row. When no more elements remain in the row to be processed, as determined in decision block 71, the height of the row is revised by setting the height of the row to the currently stored height in function block 74, and a return is made to function block 111 in FIG. 10.

Referring again to FIG. 10, at decision block 110, if no rows remain, then the rows are stacked in function block 112 to determine the current actual height of the display. Once the rows have been stacked, any extra height of the available display height is distributed in function block in Distribute Extra Height processing loop beginning with decision block 113. One should note that this processing loop is optional, and may be implemented in a variety of alternate ways, as indicated in the descriptions of FIGS. 6 and 7, above.

The processing loop is entered by a test performed in decision block 113 to determine if any rows remain. The height is revised in function block 114 distributing any extra height of the available display height among the several rows. Then, on a row-by-row basis, each row is once again compressed in function block 115, as explained above with reference to FIG. 11, the only exception being that when compression is complete, control is passed to function block 116. In function block 116, extra width of the row is distributed, also described above with reference to FIG. 12, the exception again being that when the distribution of extra width is complete, control is passed to decision block 113. This process continues until no rows remain to be processed, at which time all row information is sent to the display manager and the screen display is updated in function block 117.

Figure 13:
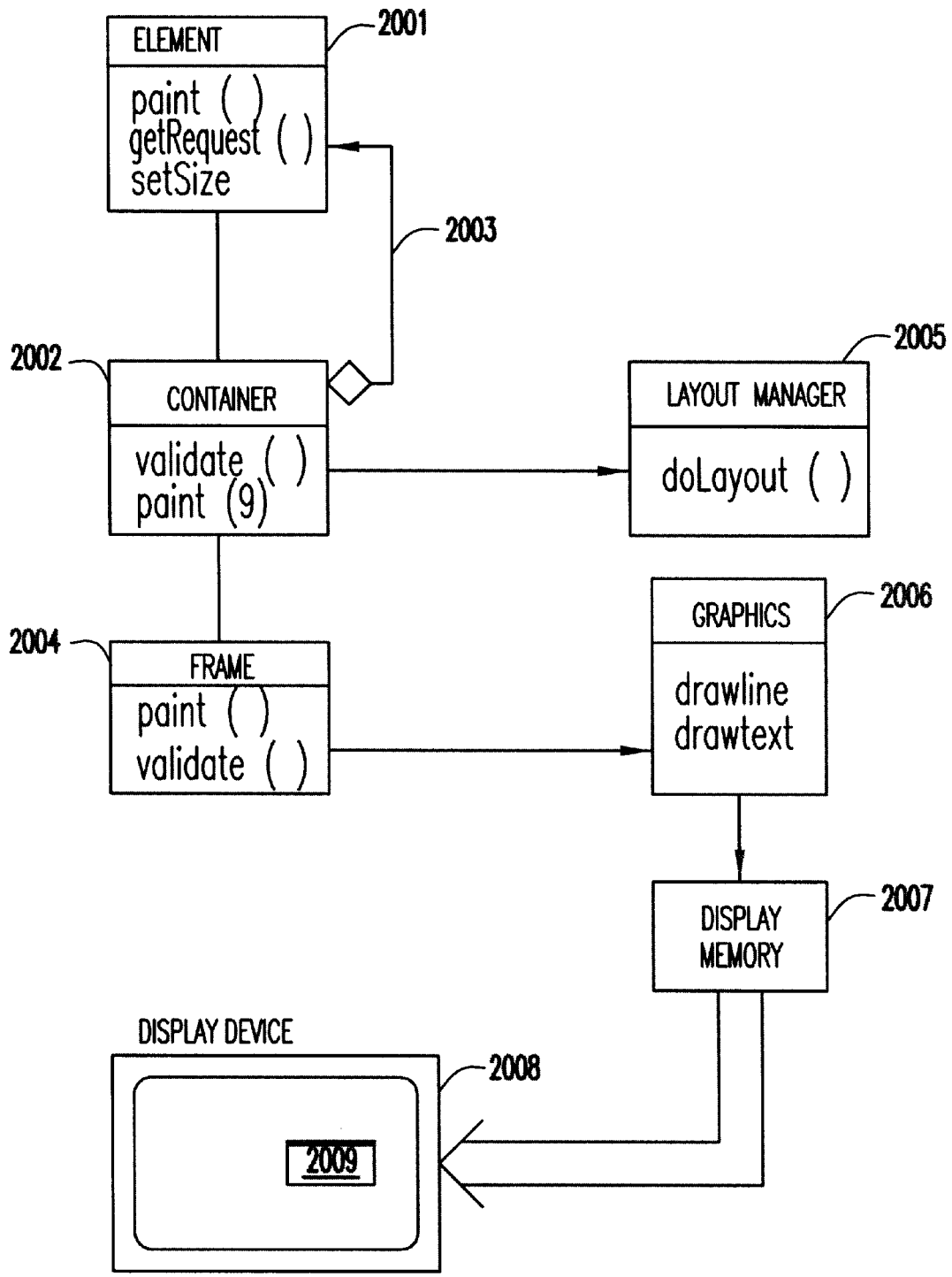
FIG. 13 shows a representation of classes defined to implement the layout manager of the present invention.

Referring now to FIG. 13, we depict a system for drawing elements on a display, including a layout manager. Elements of a user interface are represented by a class 2001 with "paint", "getrequest" and "setSize" methods. There are many subclasses of the element class which implement the variety of interaction techniques available in the interface. Once such subclass is Container class 2002. Line 2003 indicates that the Container class aggregates some number of objects of the Element class, including other container objects.

In simple terms, a container is an element which contains other elements. We refer to the elements aggregated by a container as the container's child elements. A container has a Layout Manager 2005, which has a method "doLayout" for arranging the child elements of the container. Frame 2004 is a kind of container which has an associated Graphics 2006. Graphics 2006 has methods for drawing which it implements by writing directly addressable display memory 2007. The display hardware 2008 reads display memory 2007 and represents it as a visible image 2009.

Figure 14:
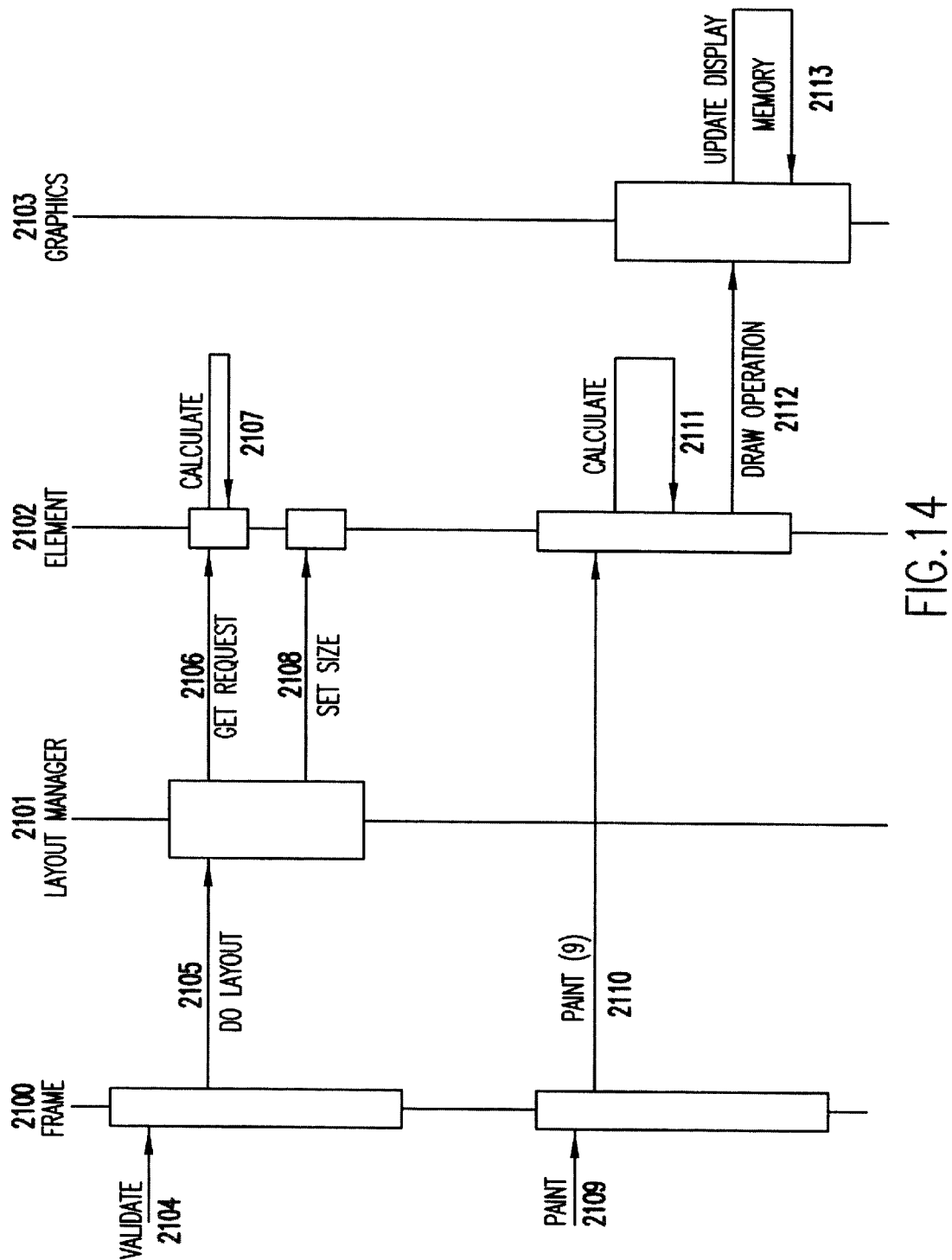
FIG. 14 shows an interaction diagram to demonstrate how objects of the classes described in FIG. 13 interact, according to the method of the invention.

Referring now to FIG. 14, we follow an interaction diagram which demonstrates how objects of the classes described in FIG. 13 interact to determine their location and draw on the display. Vertical lines 2100, 2101, 2102, and 2103 represent objects active in the system. The lines represent the lifetime of the object, with time increasing down the page. At time $t_1$, frame object 2100 receives a message to validate 2104. It responds to the validate message by invoking the doLayout method 2105 on its associated layout manager 2101. The layout manager 2101 works to calculate the size and location of the child elements of frame 2100, one of which is shown as element 2102. The layout manager 2101 invokes one or more methods against element 2102 to determine its size requests. One such request is shown as getRequest 2106. Element 2102 carries out internal computations 2107 to answer the query 2106 with its size request. If element 2102 was a container it would invoke the doLayout method of another layout manager as part of its computation. The layout manager 2101 completes its computation by setting the size of each child element by sending each a setSize message 2108. Processing of the validate message is now complete.

Frame object 2100 receives a message to paint 2109. It responds to the paint message by invoking the paint method 2110 on each child element, one of which is shown again as the element 2102. Frame 2100 sends its graphics 2103 to element 2102 with paint message 2110. Element 2102 makes internal calculations 2111 taking into account its size set at setSize 2108. It invokes one or more drawOperations 2112 against graphics 2103 to effect its appearance. Graphics 2103 updates its directly addressable display memory at 2113 in response to the drawOperations 2112.

Figure 15:
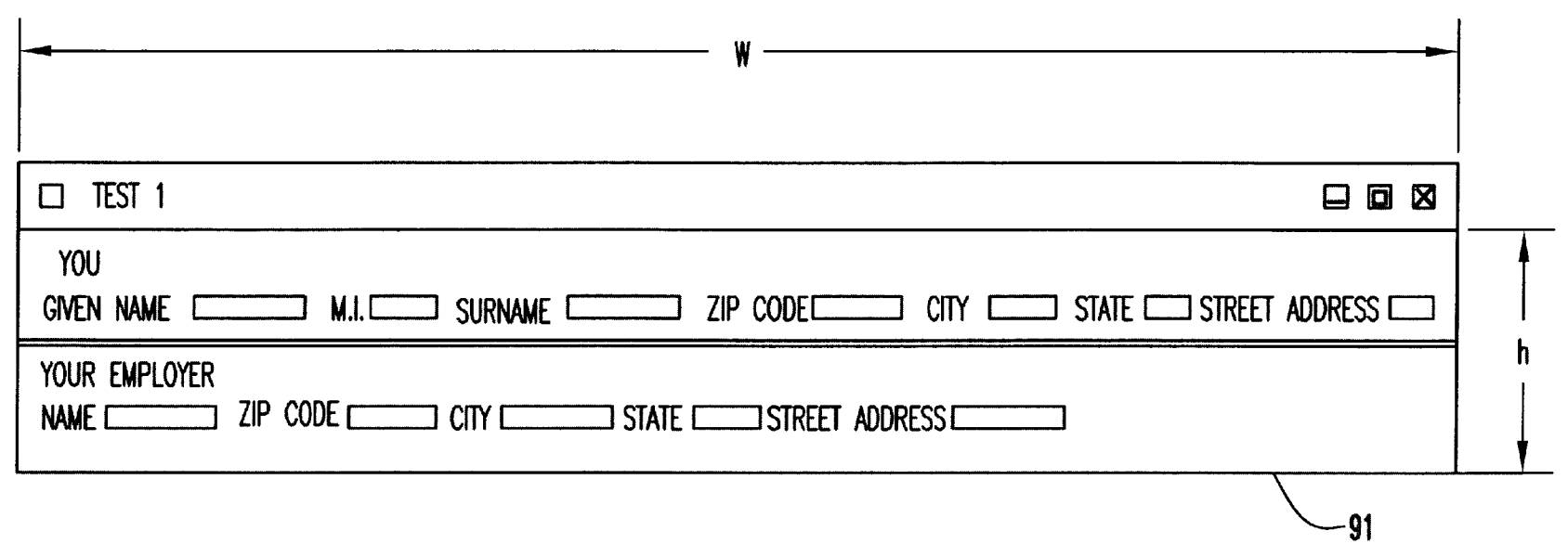

FIG. 15 shows a poorly arranged window as often results from layout managers in the prior art. One will notice at 91 that there is an unsightly amount of black unused space in this arrangement. The present invention arranges the same elements into a much more visually pleasing display as shown in FIG. 16. One immediately notices that the area of the display window in FIG. 15 requires a much larger area than the display in FIG. 16, created by the present invention. Thus, the display is not only more pleasing to the eye, but more efficient in the use of display area This improvement is a significant advantage when arranging displays for devices where the entire display are is very small, such as with personal information devices (PIDs).

The present invention is a significant improvement over the state of the art. It also functions with state of the art applications that do not have objects enhanced to answer the additional queries. The layout manager, when querying elements, will accept answers that include only minimum, maximum and preferred sizes.

One skilled in the art could easily adapt the present invention to include any one of the state of the art algorithms to arrange displays. Moreover, the method described for arranging elements performed by a layout manager may be generalized by considering the described rows to be lines with a major dimension and a minor dimension. Lines may be filled as rows with the major dimension being width, or columns with the major dimension being height. Rows may be filled left to right or right to left and stacked top to bottom or bottom to top. Columns may be filled top to bottom or bottom to top, and stacked left to right or right to left.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. An automatic method for arranging display elements on a computer screen in a display area to improve screen appearance, the display elements having preferred width to height and preferred height to width values, the method comprising the steps of:

(a) packing elements in a row until a row is filled by compressing said row, and creating additional rows as needed until all elements are packed into a row, wherein each said element is an object instantiation of an element class type of each said element, the step of compressing a row including querying those elements supporting a query for a preferred width given a height and revising width of row based on returned preferred widths for all elements in the row, wherein said query for preferred width given a height is performed as an object method for said element class type and said element returns an answer to said query using a custom computation that depends on said element class type;

(b) stacking all rows and determining extra height available in a display area;

(c) displaying arranged elements in said display area, and (d) before or after step b, distributing extra height or width among the rows.

2. An automatic method for arranging display elements on a computer screen in a display area to improve screen appearance, the display elements having preferred width to height and preferred height to width values, the method comprising the steps of:

(a) packing elements in a row until a row is filled by compressing said row, and creating additional rows as needed until all elements are packed into a row, wherein each said element is an object instantiation of the element class type of each said element, the step of compressing a row including querying those elements supporting a query for a preferred width given a height and revising width of row based on returned preferred widths for all elements in the row;

(b) stacking all rows and determining extra height available in a display area;

(c) displaying arranged elements in said display area, and (d) prior to step b, distributing extra height or width among the rows by querying elements in a row for a preferred height for a given width and trading height for width for the elements in a row, and revising the height of each row based on returned preferred heights for all elements in the row, wherein said query for a preferred height for a given width is performed as an object method for said element class type and said element returns an answer to said query using a custom computation that depends on said element class type.

3. A machine readable medium containing code for arranging display elements on a computer screen in a display area to improve screen appearance for use with a computer having a display device, the code implement the steps of:

(a) packing elements in a row until a row is filled by compressing said row, and creating additional rows as needed until all elements are packed into a row, wherein each said element is an object instantiation of the element class type of each said element, the step of compressing a row including querying those elements supporting a query for a preferred width given a height and revising width of row based on returned preferred widths for all elements in the row, wherein said query for preferred width given a height is performed as an object method for said element class type and said element returns an answer to said query using a custom computation that depends on said element class type;

(b) stacking all rows and determining extra height available in display area;

(c) displaying arranged elements in said display area, and (d) before or after step b, distributing extra height or width among the rows.

4. A machine readable medium containing code for arranging display elements on a computer screen in a display area to improve screen appearance for use with a computer having a display device, the code implements the steps of:

(a) packing elements in a row until a row is filled by compressing said row, and creating additional rows as needed until all elements are packed into a row, wherein each said element is an object instantiation of the element class type of each said element, the step of compressing a row including querying those elements supporting a query for a preferred width given a height and revising width of a row based on returned preferred widths for all elements in the row;

(b) stacking all rows and determining extra height available in display area;

(c) displaying arranged elements in said display area, and (d) distributing width-among the rows by querying elements in a row for a preferred height for a given width and trading height for width for the elements in a row, and revising the height of each row based on returned preferred heights for all elements in the row, wherein a query for a preferred height for a given width is performed as an object method for said element class type and said element returns an answer to said query using a custom computation that depends on said element class type.

5. An automatic method for arranging display elements on a computer screen in a display area to improve screen appearance, the method comprising the steps of:

(a) packing elements in a line until a line is filled by compressing said line and creating additional lines, as needed, until all elements are packed into a line, wherein each said element is an object instantiation of the element class type of each said element, and wherein compressing said line includes querying those elements supporting a query for a preferred major dimension given a minor dimension and revising said major dimensions for all elements in said line wherein said query for a preferred major dimension given a minor dimension is performed as an object method for said element class type and said element returns an answer to said query using a custom computation that depends on said element class type;

(b) stacking all lines;

(c) displaying arranged elements in a display area, and (d) before or after step b, distributing extra space in the major or minor dimensions.

6. An automatic method for arranging display elements on a computer screen in a display area to improve screen appearance, the method comprising the steps of:

(a) packing elements in a line until a line is filled by compressing said line and creating additional lines, as needed, until all elements are packed into a line, wherein each said element is an object instantiation of the element class type of each said element, and wherein compressing said line includes querying those elements supporting a query for a preferred major dimension given a minor dimension and revising said major dimensions for all elements in said line;

(b) stacking all lines;

(c) displaying arranged elements in a display area, and (d) distributing extra space in the major dimension in lines by querying elements in a line for a preferred minor dimension for a given major dimension and trading minor dimension for major dimension for the elements in a line, revising the span of the minor dimension of each line based on returned preferred minor dimensions for all elements in the line, wherein said query for a preferred minor dimension for a given major dimension is performed as an object method for said element class type and said element returns an answer to said query using a custom computation that depends on said element class type.

7. A machine readable medium containing code for arranging display elements on a computer screen in a display area to improve screen appearance, the code implementing the steps of:

(a) packing elements in a line until a line is filled by compressing said line and creating additional lines, as needed, until all elements are packed into a line, wherein each said element is an object instantiation of the element class type of each said element, and wherein compressing a line includes querying those elements supporting a query for a preferred major dimension given a minor dimension and revising said major dimensions for all elements in said line, wherein said query for a preferred major dimension given a minor dimension is performed as an object method for said element class type and said element returns an answer to said query using a custom computation that depends on said element class type;

(b) stacking all lines;

(c) displaying arranged elements in a display area, and (d) before or after step b, distributing extra space in the major or minor dimensions.

* * * * *